United States Patent
Horii et al.

(10) Patent No.: US 7,913,784 B2
(45) Date of Patent: Mar. 29, 2011

(54) SADDLE RIDE, FUEL CELL POWERED VEHICLE

(75) Inventors: Yoshiyuki Horii, Saitama (JP); Yohei Makuta, Saitama (JP); Keisuke Koitabashi, Saitama (JP); Masamoto Ito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 452 days.

(21) Appl. No.: 12/056,076

(22) Filed: Mar. 26, 2008

(65) Prior Publication Data

US 2008/0236914 A1 Oct. 2, 2008

(30) Foreign Application Priority Data

Mar. 30, 2007 (JP) ................ 2007-094246
Mar. 30, 2007 (JP) ................ 2007-094248
Mar. 30, 2007 (JP) ................ 2007-094250

(51) Int. Cl.
*B60K 6/32* (2007.10)

(52) U.S. Cl. ............... 180/65.31; 180/65.1; 180/220

(58) Field of Classification Search ............ 180/65.1, 180/220, 225, 65.31; 280/834, 835
See application file for complete search history.

(56) References Cited

U.S. PATENT DOCUMENTS

| 7,108,027 | B2 * | 9/2006 | Horii ................ 141/311 A |
| 7,234,551 | B2 * | 6/2007 | Horii ................ 180/65.1 |
| 7,389,840 | B2 * | 6/2008 | Makuta et al. ........ 180/65.31 |
| 2006/0040160 | A1 | 2/2006 | Horii et al. |
| 2006/0060400 | A1 * | 3/2006 | Iwashita et al. ........ 180/65.3 |
| 2007/0122671 | A1 * | 5/2007 | Shimizu et al. ........ 429/26 |

FOREIGN PATENT DOCUMENTS

| CN | 1735748 A | 2/2006 |
| JP | 2003-291849 A | 10/2003 |
| JP | 2005-112094 A | 4/2005 |

* cited by examiner

*Primary Examiner* — J. Allen Shriver, II
*Assistant Examiner* — John D. Walters
(74) *Attorney, Agent, or Firm* — Birch, Stewart, Kolasch & Birch, LLP

(57) ABSTRACT

A saddle ride vehicle includes a fuel cell formed in a rectangular, parallelepiped shape disposed below a vehicle seat. The fuel cell is inclined toward a vehicle rear. A pivot shaft is disposed in a range X defined forwardly of a vertex P of a side-view rectangle of the fuel cell, and defined rearwardly of a vertex Q of the side-view rectangle, and is disposed in a range Y defined below the vertex P and defined above the vertex Q. Foot rest parts are disposed between a steering handle and the seat. The fuel cell is disposed on the side of the foot rest parts, so that the center of gravity G1 of the fuel cell is located on the vehicle body front side relative to the seating part center G2 in the front-rear direction of the center of gravity of the driver at the time of riding.

20 Claims, 12 Drawing Sheets

VEHICLE WIDTH DIRECTION

1

SADDLE RIDE, FUEL CELL POWERED VEHICLE

CROSS-REFERENCE TO RELATED APPLICATION

The present application claims priority under 35 U.S.C. §119 to Japanese Patent Application Nos. 2007-094250, 2007-094246, and 2007-094248, each of which was filed Mar. 30, 2007, the entire contents of which are hereby incorporated by reference.

BACKGROUND OF THE INVENTION

1. Field of the Invention

The present invention relates to a saddle ride, fuel cell powered vehicle, and particularly to a saddle ride, fuel cell powered vehicle in which the overall length of the vehicle can be reduced while keeping an appropriate weight balance in the vehicle body front-rear direction. The fuel cell powered vehicle having such a configuration that the efficiency in supplying a reactant gas to a fuel cell can be enhanced, that a sufficient amount of the reactant gas can be sucked into the fuel cell without enlarging a supercharger, and that leakage of hydrogen from any part of hydrogen reserving means and each hydrogen passage can be detected assuredly.

2. Description of Background Art

Conventionally, there have been known fuel cell powered vehicles on which a fuel cell for generating electric power through a chemical reaction between hydrogen and oxygen is mounted and which are driven to run by the electric power supplied from the fuel cell. In such a vehicle, the fuel cell occupying a large proportion of the vehicle weight is in many cases disposed in the vicinity of the center of the vehicle body, in consideration of the weight balance in the vehicle body front-rear direction.

Japanese Patent Laid-open No. 2005-112094 discloses a fuel cell powered motorcycle in which a fuel cell is disposed at the lowest part of the vehicle body and substantially at the center in the front-rear direction of the vehicle body.

According to the technique disclosed in Japanese Patent Laid-open No. 2005-112094, however, the longitudinal direction of the fuel cell is set in the vehicle body front-rear direction, so that it is difficult for a pivot shaft for swingably supporting a swing arm to be located rather on the front side relative to a rear end part of the fuel cell. This makes it difficult to apply the technique of contriving a reduction in the overall vehicle body length by shortening the wheel base, while securing a sufficient swing arm length.

In addition, conventional fuel cell powered vehicles have been known on which a fuel cell for generating electric power through a chemical reaction between hydrogen and oxygen is mounted and which are driven to run by the electric power supplied from the fuel cell. In a solid polymer membrane type fuel cell supplied with a hydrogen-containing fuel gas and an oxygen-containing reactant gas, suction ports for the fuel gas and the reactant gas are preferably provided on the upper side of the fuel cell, since the reaction product water produced at the time of power generation flows to the lower side of the fuel cell due to gravity.

Japanese Patent Laid-open No. 2005-112094 discloses a configuration of a fuel cell powered vehicle based on application of a direct methanol type fuel cell, wherein a reactant gas supply port is provided on the upper side of the fuel cell.

As a technique for supplying the fuel cell with a larger quantity of the reactant gas, it may be contemplated to enhance the ability of the supercharger to supply the reactant gas to the fuel cell. From this point of view, the above-mentioned problem has hitherto been solved by enlarging the supercharger. However, with regard to a configuration which makes it possible to supply the reactant gas in an amount sufficient for the power generating reaction by enhancing the efficiency in supplying the reactant gas to the fuel cell without enlarging the supercharger, there has yet been room for contrivance. Such a configuration is not investigated in Japanese Patent Laid-open No. 2005-112094.

Still further, conventional fuel cell powered vehicles have been known on which a fuel cell for generating electric power through a chemical reaction between hydrogen and oxygen is mounted and which are driven to run by the electric power supplied from the fuel cell. In relation to such a fuel cell powered vehicle, a configuration is publicly known in which a hydrogen sensor for detecting leakage of hydrogen from any part of hydrogen reserving means, such as a hydrogen cylinder, and each hydrogen passage is mounted.

Japanese Patent Laid-open No. 2003-291849 discloses a configuration of a fuel cell powered vehicle having a compartment shielded from the outside air, wherein a hydrogen sensor is mounted at the highest position of a roof panel constituting a ceiling part of the compartment, whereby penetration of hydrogen (which is lighter than air) into the compartment can be recognized efficiently.

However, Japanese Patent Laid-open No. 2003-291849 contains little investigation as to a configuration for a saddle ride, fuel cell powered vehicle such as a motorcycle and a three-wheel vehicle having no compartment, wherein leakage of hydrogen from any part of hydrogen reserving means and each hydrogen passage can be detected.

SUMMARY AND OBJECTS OF THE INVENTION

It is an object of the present invention to provide, for solving the above-mentioned problem involved in the prior art, a saddle ride, fuel cell powered vehicle in which the overall vehicle body length can be reduced while retaining an appropriate weight balance in the vehicle body front-rear direction. It is another object of the present invention to provide a fuel cell powered vehicle having such a configuration that the efficiency in supplying a fuel cell with a reactant gas can be enhanced and that a sufficient quantity of the reactant gas can be sucked into the fuel cell without enlarging a supercharger. It is still another object of the present invention to provide a saddle ride, cell powered vehicle having a configuration in which leakage of hydrogen from any part of hydrogen reserving means and each hydrogen passage can be detected assuredly.

According to an embodiment of the present invention, a saddle ride, fuel cell powered vehicle is driven to run by electric power supplied from a fuel cell. The vehicle includes a pivot shaft for swingably supporting a swing arm on a vehicle body frame, with a rear wheel mounted to the swing arm, and a seat for seating a driver. The fuel cell is formed in a substantially rectangular parallelepiped shape, and is disposed on the lower side of the seat in the state of being inclined toward the vehicle body rear side from the state of having its longitudinal direction in the vertical direction. The pivot shaft is disposed in a range which is defined on the front side of a vertex, located at the rear end, of the side-view rectangle of the fuel cell and which is defined on the rear side of a vertex, located at the lower end, of the side-view rectangle of the fuel cell.

According to an embodiment of the present invention, the pivot shaft is disposed in a range which is defined on the lower side of a vertex, located at the rear end, of the side-view rectangle of the fuel cell and which is defined on the upper side of a vertex, located at the lower end, of the side-view rectangle of the fuel cell.

According to an embodiment of the present invention, the saddle ride, fuel cell powered vehicle further includes a steering handle for steering a front wheel; and foot rest parts for a driver are provided between the steering handle and the seat, and the fuel cell is disposed on the vehicle body rear side of the foot rest parts so that the center of gravity of the fuel cell is located on the vehicle body front side relative to the center in the front-rear direction of a seating part on which to seat the driver at the time of riding.

According to an embodiment of the present invention, the vehicle saddle ride, fuel cell powered vehicle further includes hydrogen reserving means for reserving hydrogen gas to be supplied to the fuel cell; the hydrogen reserving means is disposed on the upper side of a rear wheel; and a hydrogen gas supply port of the fuel cell is provided on the upper part side in the longitudinal direction of the fuel cell.

According to an embodiment of the present invention, a fuel cell which generates electric power is supplied with a hydrogen-containing fuel gas and an oxygen-containing reactant gas and which discharges an unreacted gas and reaction product water. In addition, the fuel cell includes a case for containing a plurality of cells stacked, a reactant gas suction port for supplying the reactant gas from the upper side of the case, and an unreacted gas discharge port for discharging the unreacted gas from the lower side of the case; and two such reactant gas suction ports are provided so as to be substantially perpendicular to the plane of the cells and to be located on opposite sides of the case.

According to an embodiment of the present invention, the fuel cell powered vehicle further includes a suction-side manifold for connecting the two reactant gas suction ports to each other on the outside of the case, a supercharger for forcibly supplying the reactant gas, and a reactant gas pipe for connection between the supercharger and the suction-side manifold.

According to an embodiment of the present invention, two such unreacted gas discharge ports are provided so as to be substantially perpendicular to the plane of the cells and to be located on opposite sides of the case; and the fuel cell powered vehicle further includes a discharge-side manifold for connecting the two unreacted gas discharge ports to each other on the outside of the case.

According to an embodiment of the present invention, a saddle ride, fuel cell powered vehicle is driven to run by electric power supplied from a fuel cell. The saddle ride, fuel cell powered vehicle includes hydrogen reserving means for reserving hydrogen gas to be supplied to the fuel cell, and a hydrogen sensor for detecting the hydrogen gas. The saddle ride, fuel cell powered vehicle has an exterior equipment covering a vehicle body, and has a configuration in which the outside air is introduced through an opening provided on the vehicle body front side of the exterior equipment into the inside of the vehicle body, is passed through the inside of the vehicle body inclusive of the fuel cell, is then converged to a rear part of the vehicle body and is discharged to the exterior. The hydrogen reserving means is disposed on the vehicle body rear side relative to the fuel cell, and the hydrogen sensor is disposed near a rear end part of the hydrogen reserving means.

According to an embodiment of the present invention, the hydrogen reserving means is disposed with its longitudinal direction set along the vehicle body front-rear direction, and a second hydrogen sensor is disposed near a front end part of the hydrogen reserving means.

According to an embodiment of the present invention, a motor-driven fan for forcibly introducing the outside air into the inside of the vehicle body is provided at the opening.

Effects of the Invention Include the Following:

According to the embodiment of the present invention, the fuel cell is formed in a substantially rectangular parallelepiped shape, and is disposed on the lower side of the seat in the state of being inclined toward the vehicle body rear side from the state of having its longitudinal direction in the vertical direction; and the pivot shaft is disposed in a range which is defined on the front side of a vertex, located at the rear end, of the side-view rectangle of the fuel cell and which is defined on the rear side of a vertex, located at the lower end, of the side-view rectangle of the fuel cell. Therefore, the pivot shaft can be disposed rather on the vehicle body front side, as compared with the case where, for example, the fuel cell is disposed with its longitudinal direction set in the vehicle body front-rear direction. This makes it possible to contrive a reduction in the overall vehicle body length by shortening the wheel base, while securing a sufficient swing arm length. Furthermore, since the fuel cell is inclined toward the vehicle body rear side, the reaction product water produced at the time of power generation and collecting on the lower side of the fuel cell is permitted to flow favorably, whereby draining performance can be enhanced.

According to the embodiment of the present invention, the pivot shaft is disposed in a range which is defined on the lower side of a vertex, located at the rear end, of the side-view rectangle of the fuel cell and which is defined on the upper side of a vertex, located at the lower end, of the side-view rectangle of the fuel cell. Therefore, the fuel cell is disposed on the vehicle body lower side, whereby a lowering of the center of gravity can be contrived, and a compacter vehicle body can be obtained.

According to the embodiment of the present invention, the saddle ride, fuel cell powered vehicle further includes a steering handle for steering a front wheel; and foot rest parts for a driver are provided between the steering handle and the seat, and the fuel cell is disposed on the vehicle body rear side of the foot rest parts so that the center of gravity of the fuel cell is located on the vehicle body front side relative to the center in the front-rear direction of a seating part on which to seat the driver at the time of riding. Therefore, the center of gravity of the fuel cell can be set on the vehicle body front side relative to the center of gravity of the driver at the time of riding, the centers of gravities of heavyweight bodies can be concentrated substantially in the center in the vehicle front-rear direction, and the weight balance in the front-rear direction of the vehicle body can be enhanced. In addition, since the fuel cell is disposed on the vehicle body rear side of the foot rest parts, the rider does not stride over the fuel cell when he gets on or gets off the vehicle, so that it is made easier for the rider to get on or get off the saddle ride, fuel cell powered vehicle.

According to the embodiment of the present invention, the vehicle saddle ride, fuel cell powered vehicle further includes hydrogen reserving means for reserving hydrogen gas to be supplied to the fuel cell; the hydrogen reserving means is disposed on the upper side of a rear wheel; and a hydrogen gas supply port of the fuel cell is provided on the upper part side in the longitudinal direction of the fuel cell. Therefore, the distance between the hydrogen reserving means and the hydrogen gas suction port of the fuel cell is reduced, the hydrogen supply path such as the fuel gas pipe is shortened, and pressure loss can be thereby reduced.

According to the embodiment of the present invention, the fuel cell includes a case for containing a plurality of cells stacked, a reactant gas suction port for supplying the reactant gas from the upper side of the case, and an unreacted gas discharge port for discharging the unreacted gas from the lower side of the case; and two reactant gas suction ports are provided so as to be substantially perpendicular to the plane of the cells and to be located on opposite sides of the case. Therefore, it becomes easy to increase the quantity of the reactant gas sucked in, and the reactant gas supplying efficiency can be enhanced. As a result, it becomes possible to supply the reactant gas in a sufficient quantity necessary for the fuel cell, without enlarging a supercharger. In addition, since the reactant gas is introduced through both side parts of the case, the reactant gas can be supplied evenly with regard to the stacking direction of the cell stack, as compared for example with a system in which the reactant gas is sucked in from either one of the opposite sides, and it becomes possible to enhance the power generation efficiency of the fuel cell.

According to the embodiment of the present invention, the fuel cell powered vehicle further includes a suction-side manifold for connecting the two reactant gas suction ports to each other on the outside of the case, a supercharger for forcibly supplying the reactant gas, and a reactant gas pipe for connection between the supercharger and the suction-side manifold. Therefore, by use of the single reactant gas pipe, it becomes possible to supply the reactant gas simultaneously through the two reactant gas suction ports. In addition, since the layout position of the reactant gas pipe can be modified by modifying the position of connection with the suction-side manifold, the layout of the reactant gas pipe is not limited although the two reactant gas suction ports are provided, and it becomes possible to enhance the degree of freedom in designing the vehicle body and the like.

According to the embodiment of the present invention, two unreacted gas discharge ports are provided so as to be substantially perpendicular to the plane of the cells and to be located on opposite sides of the case; and the fuel cell powered vehicle further includes a discharge-side manifold for connecting the two unreacted gas discharge ports to each other on the outside of the case. Therefore, it becomes possible to reduce the resistance to discharge of the unreacted gas, and, accordingly, to suck in a larger quantity of the reaction gas, thereby enhancing the power generation efficiency of the fuel cell.

According to the embodiment of the present invention, the saddle ride, fuel cell powered vehicle includes hydrogen reserving means for reserving hydrogen gas to be supplied to the fuel cell, and a hydrogen sensor for detecting the hydrogen gas. The saddle ride, fuel cell powered vehicle has an exterior equipment covering a vehicle body, and has a configuration in which the outside air is introduced through an opening provided on the vehicle body front side of the exterior equipment into the inside of the vehicle body, is passed through the inside of the vehicle body inclusive of the fuel cell, is then converged to a rear part of the vehicle body and is discharged to the exterior. The hydrogen reserving means is disposed on the vehicle body rear side relative to the fuel cell; and the hydrogen sensor is disposed near a rear end part of the hydrogen reserving means.

Therefore, the flow of air converged to the vehicle body rear side passes through the peripheries of all the hydrogen passages, so that leakage of hydrogen at any position can be detected assuredly. In addition, even if hydrogen leakage should occur, the leaked hydrogen would be swiftly discharged to the exterior of the vehicle body, so that hydrogen is prevented from stagnating in the inside of the vehicle body.

Further, the fuel cell accompanied by heat generation at the time of power generation can be cooled by utilizing the flow of air in the inside of the vehicle body.

According to the embodiment of the present invention, the hydrogen reserving means is disposed with its longitudinal direction set along the vehicle body front-rear direction, and a second hydrogen sensor is disposed near a front end part of the hydrogen reserving means. Therefore, leakage of hydrogen at a position on the vehicle body front side relative to the hydrogen reserving means, for example, at the fuel cell can be detected swiftly. In addition, in the case where, for example, hydrogen leakage is detected by the hydrogen sensor near the rear end part of the hydrogen reserving means but hydrogen leakage is not detected by the second hydrogen sensor, it is possible to specifically judge that the position of the hydrogen leakage is on the vehicle body rear side relative to the second hydrogen sensor.

According to the embodiment of the present invention, a motor-driven fan for forcibly introducing the outside air into the inside of the vehicle body is provided at the opening. Therefore, airflow similar to that during running can be obtained even when the vehicle is at stoppage, and, even if hydrogen leakage should occur, the leakage can be detected assuredly, and the leaked hydrogen can be swiftly discharged to the exterior of the vehicle body. In addition, the fuel cell can be cooled with the airflow even when the vehicle is at stoppage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
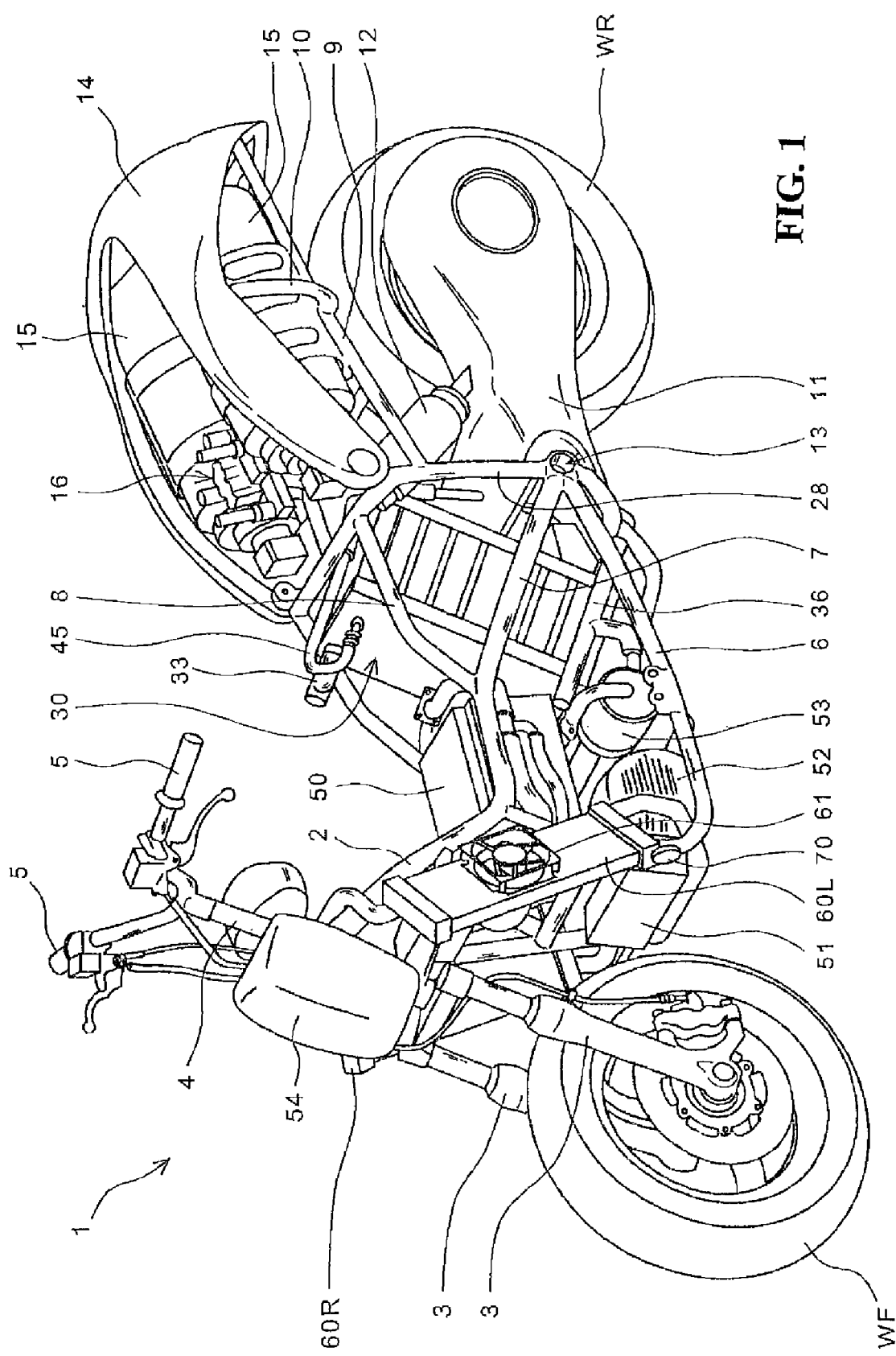
FIG. 1 is a perspective view of a saddle ride, fuel cell powered vehicle according to an embodiment of the present invention.
Figure 2:
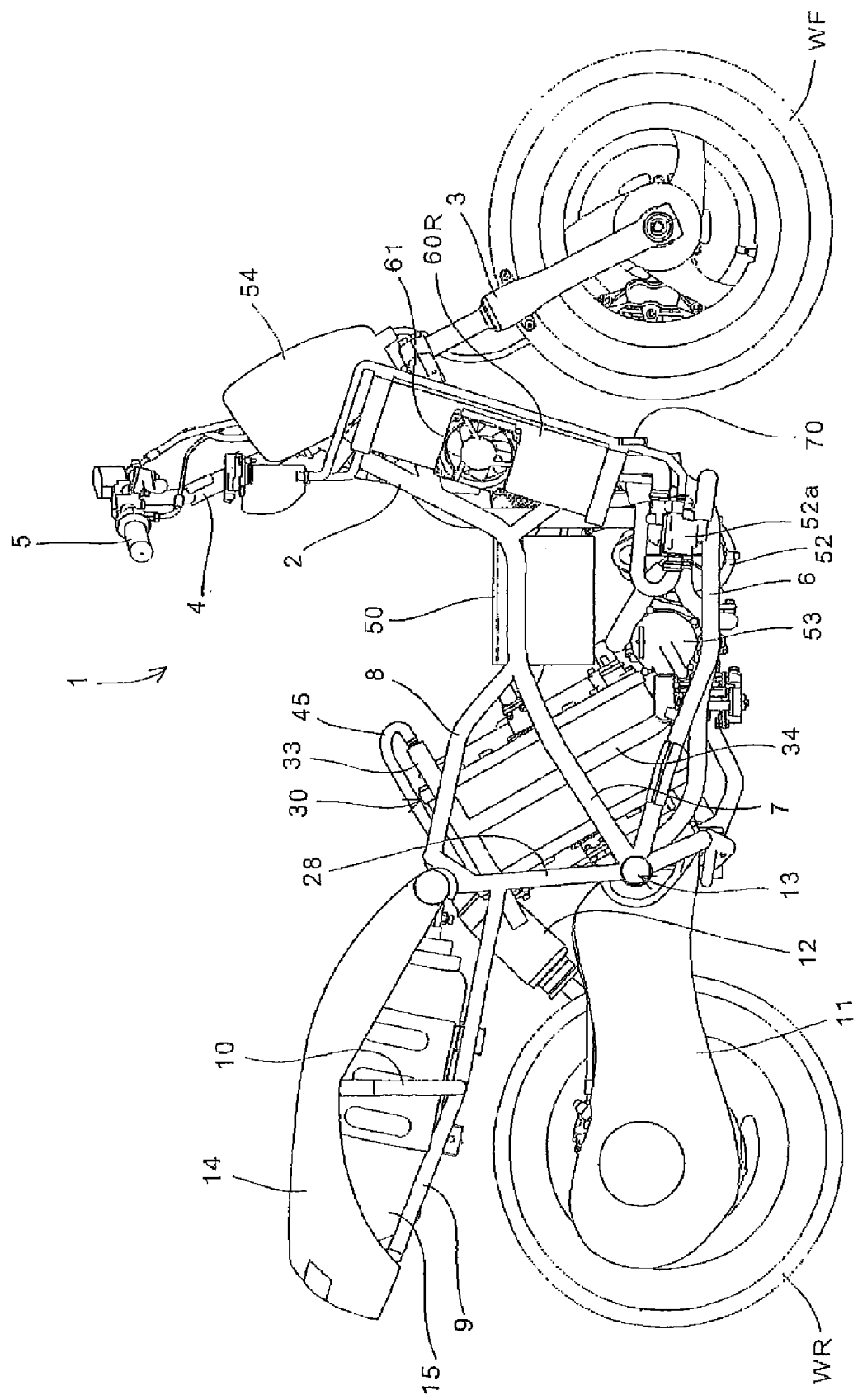
FIG. 2 is a right side view of a saddle ride, fuel cell powered vehicle according to an embodiment of the present invention.

FIG. 1 is a perspective view of a fuel cell powered vehicle 1 according to an embodiment of the present invention. FIG. 2 is a right side view of the fuel cell powered vehicle 1. The fuel cell powered vehicle 1 as a saddle ride, motorcycle has a fuel cell power generation system including a cell stack (inclusive of electrodes, a separator, an electrolyte membrane and the like) having a plurality of cells stacked, a fuel (hydrogen) gas supply system for supplying hydrogen gas as a fuel to the cell stack, and a reactant gas supply system for supplying an oxygen-containing reactant gas (air) to the cell stack. Hereinafter, a substantially rectangular parallelepiped casing containing the cell stack therein will, as a whole, be referred to as a fuel cell 30.

The fuel cell powered vehicle 1 has a framework including a main frame 2 to which a head pipe for turnably supporting a handle post 4 of a steering handle 5 is joined, an under frame 6 joined to the head pipe and extending rearwards on the lower side of a vehicle body, a guard pipe 7 covering the fuel cell 30 disposed substantially at the center of the vehicle body, an upper pipe 8 disposed on the upper side of the guard pipe 7, a connecting pipe 28 extending upwards from a rear end part of the guard pipe 7 and connected to the upper pipe 8, and a rear frame 9 for supporting two hydrogen cylinders 15 on the rear side of the upper pipe 8. A left-right pair type front fork 3 for rotatably supporting a front wheel WF is mounted on the lower side of the handle post 5, and the steering angle of the front wheel WF can be changed by turning the steering handle 5.

A swing arm 11 suspended from the vehicle body by a rear cushion 12 is swingably supported on a pivot shaft 13 provided at a rear end part of the under frame 6. A driving motor (not shown) as a power source of the fuel cell powered vehicle 1 is incorporated in the swing arm 11, and a rear wheel WR is driven by the driving motor.

A scroll type compressor 52 as a supercharger for forcibly feeding the reactant gas under pressure, a humidifier 53 for controlling the humidity of the reactant gas, the fuel cell 30 having the substantially rectangular parallelepiped shape, a voltage converter unit (VCU) 50 for raising or lowering the power generation voltage of the fuel cell 30 so as to convert the voltage to a predetermined voltage, and a secondary cell 51 for storing the electric power supplied from the fuel cell 30 are disposed in a space surrounded by the main frame 2 and the under frame 6. In addition, a left-right pair of radiators 60L, 60R for cooling the cooling water for the fuel cell 30 are mounted on the vehicle body front side of the main frame 2, and motor-driven cooling fans 61 for enhancing the cooling effect are disposed at back surface parts of the radiators 60L, 60R.

The fuel cell 30 being rectangular in side view is mounted to the vehicle body in the state of having the rectangular side-view shape as a vertically elongate shape and being inclined toward the vehicle body rear side. The fuel cell 30 is fitted with a fuel gas pipe 45 for supplying a hydrogen-containing fuel gas, a suction-side manifold 33 as a piping for supplying an oxygen-containing reactant gas, and a discharge-side manifold 36 as a piping for discharging both an unreacted gas having passed through the cell stack and reaction product water. The substantially cylindrical hydrogen cylinders 15 are supported by the rear frame 9 and a guide pipe 10 on the upper side of the rear wheel (drive wheel) WR in the condition where the valve side thereof to be connected to a hydrogen cylinder regulator 16 is directed toward the vehicle body front side.

Hydrogen contained in the hydrogen cylinders 15 is supplied through the fuel gas pipe 45 to the fuel cell 30 after its pressure is lowered by the hydrogen cylinder regulator 16, which is electrically controlled based on data sent from various sensors and the like. Incidentally, a rear cowl 14 as a part of an armor member is disposed on the upper side of the rear frame 9 so as to cover the hydrogen cylinders 15.

An air cleaner box 54 for filtration of the outside air is provided on the vehicle body front side of the handle post 4, and the air introduced through the air cleaner box 54 is fed under pressure to the humidifier 53 by the scroll type compressor 52. The reactant gas appropriately humidified by the humidifier 53 is fed under pressure to the fuel cell 30 through a reactant gas pipe 34 and the suction-side manifold 33 connected to the reactant gas pipe 34.

A left-right pair of motor-driven fans 70 for positively introducing the outside air to the inside of the armor member (not shown) formed from resin sheets or the like and covering the vehicle body, i.e., into the inside of the vehicle body are mounted on the lower side of the radiators 60L, 60R. In addition, a thermostat 52a for keeping the temperature of the cooling water for the fuel cell 30 at a predetermined value is mounted on the right side in the vehicle width direction of the scroll type compressor 52.

Figure 3:
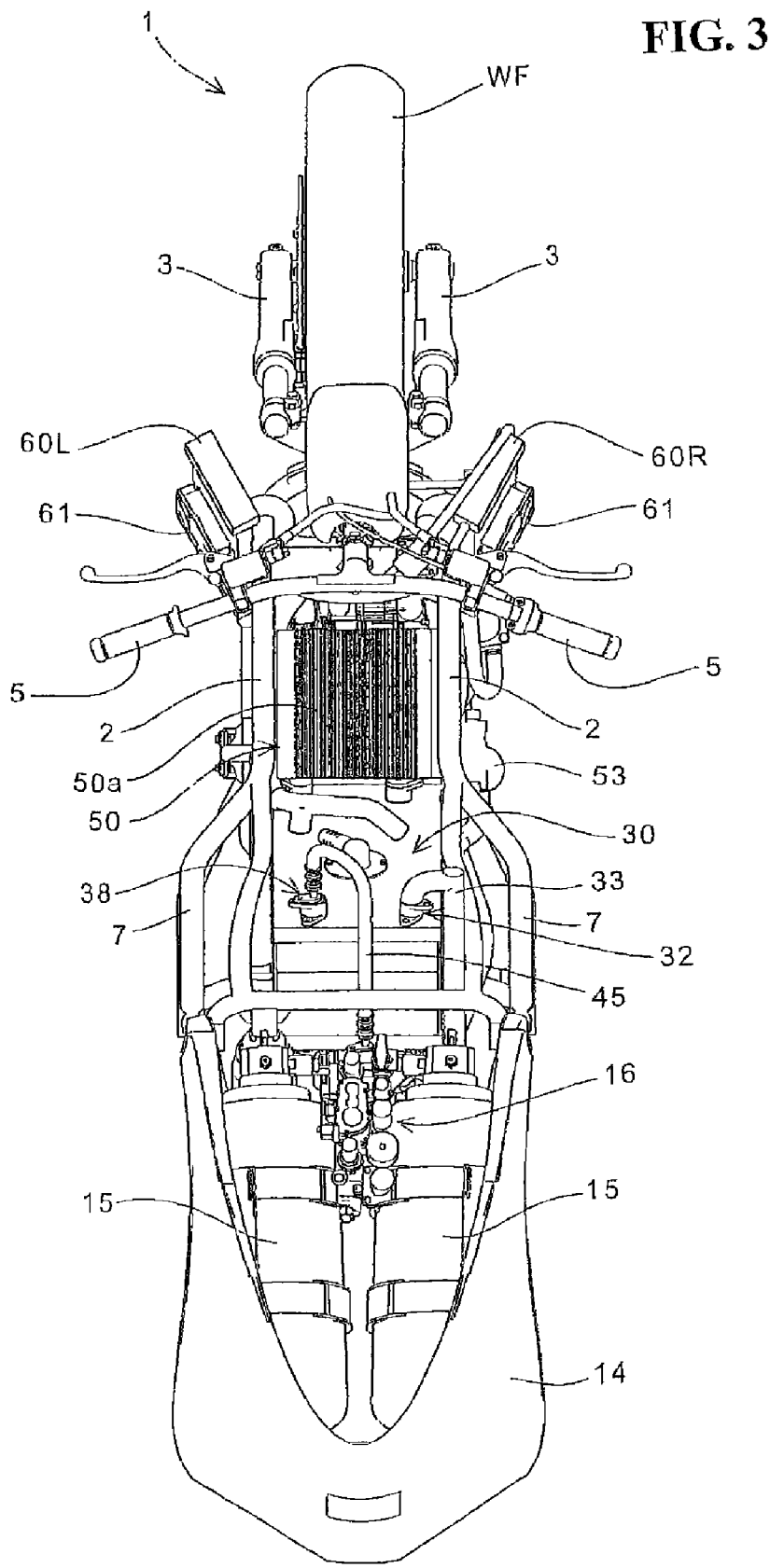
FIG. 3 is a top plan view of a saddle ride, fuel cell powered vehicle according to an embodiment of the present invention.

FIG. 3 is a top plan view of the saddle ride, fuel cell powered vehicle 1. The same symbols as used above denote the parts which are the same as or equivalent to those shown above. A fuel gas suction hole 38 connected to a fuel gas pipe 45 and a reactant gas suction port 32 connected to the suction-side manifold 33 are provided at upper parts of the fuel cell 30 disposed in the center in the vehicle width direction. Such a layout of the fuel gas suction hole 38 ensures that the distance between the fuel gas suction hole 38 and the hydrogen cylinders 15 disposed on the upper side of the rear wheel WR is reduced, so that the hydrogen supply path such as the fuel gas pipe 45 can be shortened, and pressure loss can be reduced.

A voltage converter unit 50 having a substantially rectangular parallelepiped shape is disposed on the vehicle body front side of the fuel cell 30 in the center in the vehicle width direction so that the left-right pair of main frames 2 are located on both lateral sides thereof. Radiating fins 50a composed of a multiplicity of thin plate-like members made of a metal or the like and erected in the vehicle body front-rear direction are attached to the top surface of the voltage converter unit 50.

Figure 4:
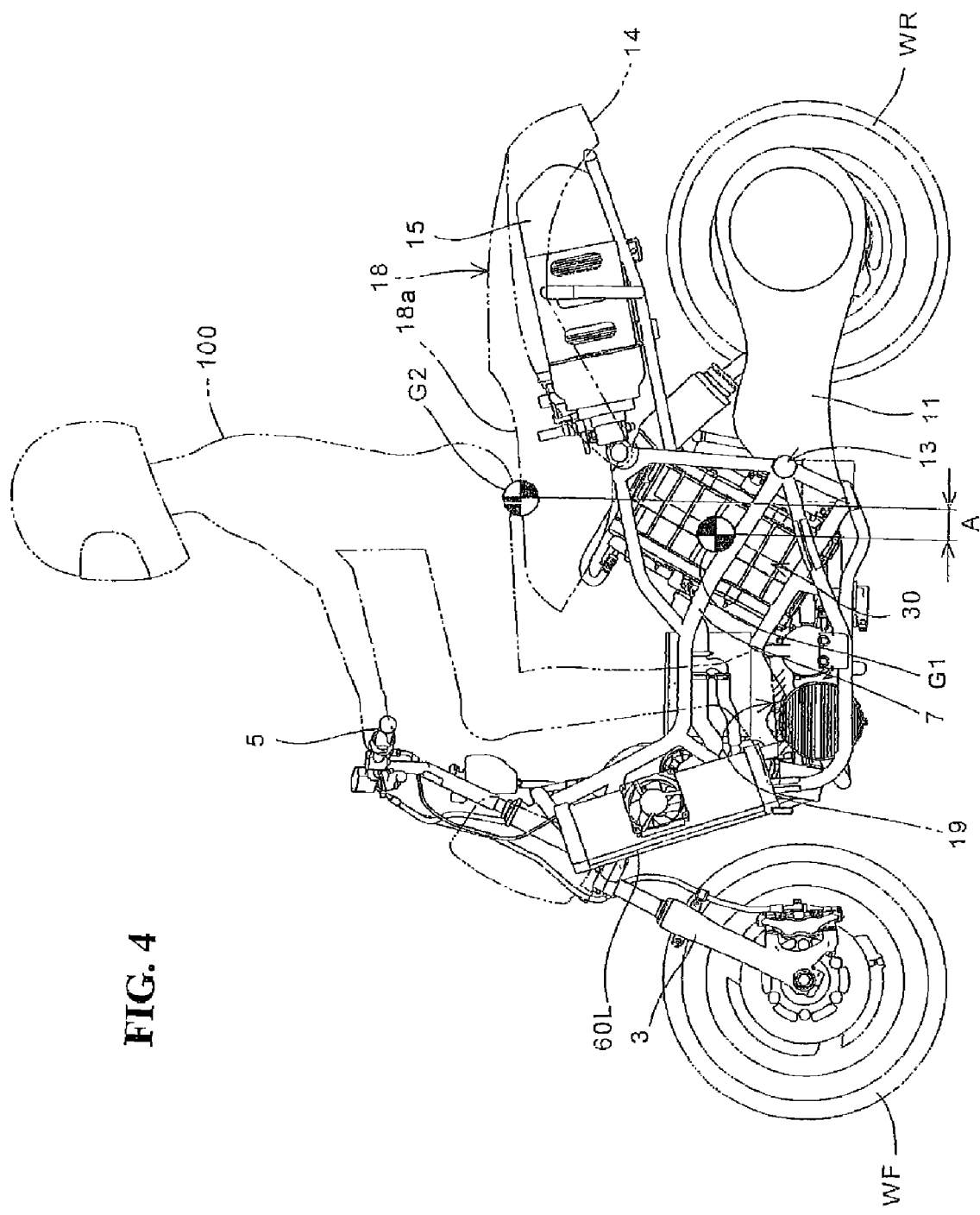
FIG. 4 is a left side view of a saddle ride, fuel cell powered vehicle according to an embodiment of the present invention.
Figure 5:
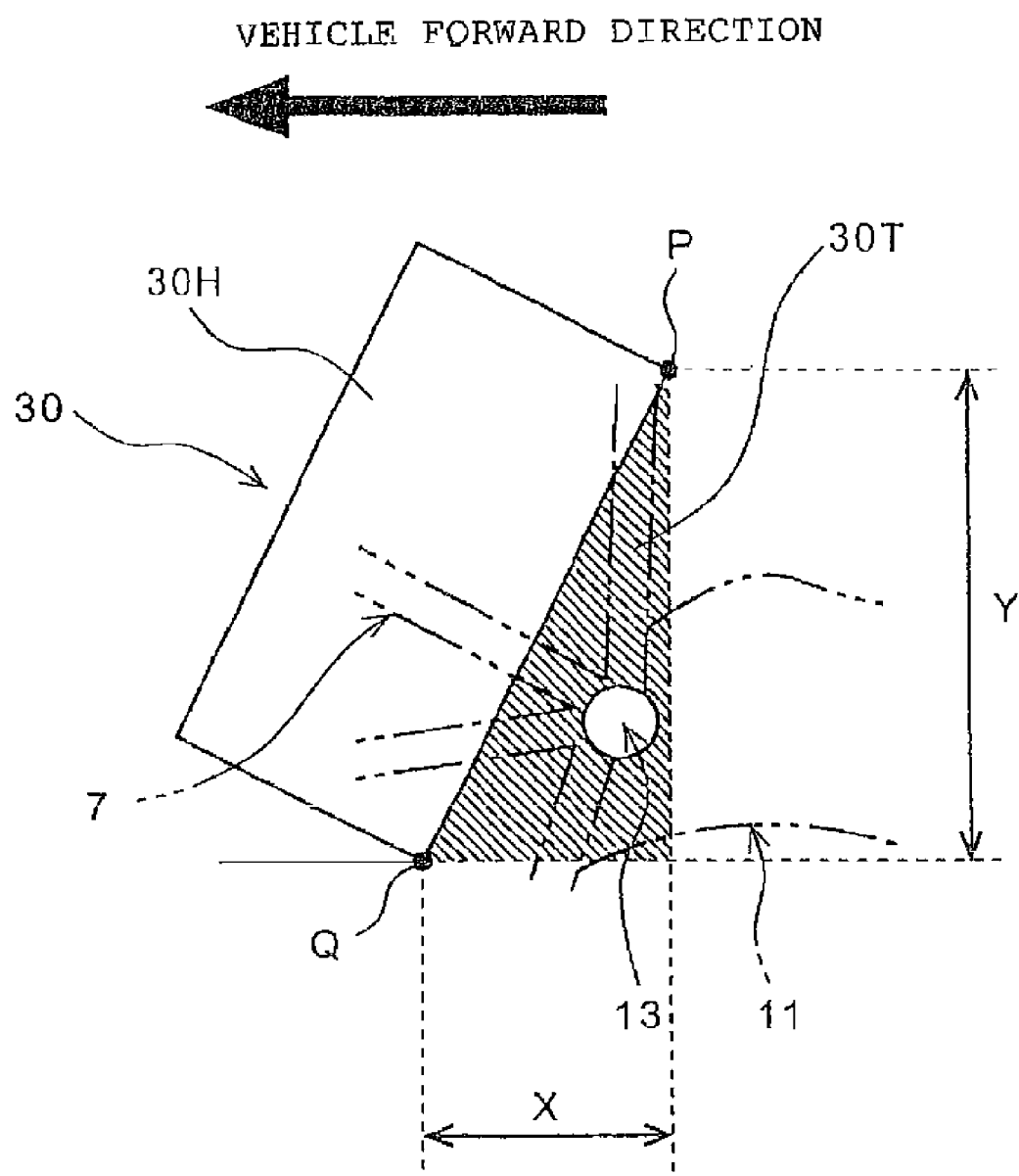
FIG. 5 is a schematic view showing the layout condition of the fuel cell.

FIG. 4 is a left side view of the saddle ride, fuel cell powered vehicle 1. In addition, FIG. 5 is a schematic view showing the layout condition of the fuel cell 30. The same symbols as used above denote the parts which are the same as or equivalent to those shown above. In the saddle ride, fuel cell powered vehicle 1 according to this embodiment, foot rest plates 19 for mounting the driver's feet thereon when the driver 100 rides the vehicle are provided between the steering handle 5 and the seat 18, and the fuel cell 30 is disposed on the vehicle body rear side of the foot rest parts 19. Such a layout of the fuel cell 30 ensures that the center of gravity G2 of the fuel cell 30 can be located on the vehicle body front side relative to the seating part center G2 in the front-rear direction of a driver seating part 18a, on which the driver 100 is seated, of a seat 18, in other words, relative to the center of gravity of the driver 100 at the time of riding; thus, the centers of gravity of heavyweight bodies can be concentrated substantially in the center in the vehicle body front-rear direction, and the weight balance in the front-rear direction of the vehicle body can be enhanced.

In this embodiment, as shown in FIG. 4, the center of gravity G1 of the fuel cell 30 is set on the vehicle body front side relative to the seating part center G2 in the front-rear direction of the driver seating part 18a, i.e., relative to the center of gravity of the driver 100 at the time of riding, by the distance A. Besides, since the fuel cell 30 is disposed on the vehicle body rear side of the foot rest parts 19, the driver 100 does not stride over the fuel cell 30 when he gets on or gets off the vehicle, so that it is made easier for the driver 100 to get on and get off the saddle ride, fuel cell powered vehicle 1.

Referring to FIG. 5, the fuel cell 30 formed in a substantially rectangular parallelepiped shape is disposed on the lower side of the seat 18 in the state of being inclined toward the vehicle body rear side from the state of having its longitudinal direction set vertical. This makes it possible for the pivot shaft 13 for swingably supporting the swing arm 11 to be disposed rather on the vehicle body front side, as compared with the case where, for example, the fuel cell is disposed with its longitudinal direction set in the vehicle front-rear direction. Here, paying attention to the side-view rectangle 30H of the fuel cell 30, a vertex P is located at a rear end part of the side-view rectangle 30H, and a vertex Q is located at a lower end part of the side-view rectangle 30H. In this embodiment, the pivot shaft 13 is disposed in a range X which is defined on the front side of the vertex P of the side-view rectangle 30H and which is defined on the rear side of the vertex Q, and the pivot shaft 13 is disposed in a range Y which is defined on the lower side of the vertex P and which is defined on the upper side of the vertex Q. As a result, the pivot shaft 13 is contained in a right-angled triangle 30T adjacent to the side-view rectangle 30H, whereby it is made possible to contrive a reduction in the overall vehicle body length by shortening the wheel base, while securing a sufficient swing arm length.

In addition, it is possible to dispose the fuel cell 30 on the vehicle body lower side, thereby to contrive a lowering of the center of gravity, and to obtain a compacter vehicle body. Further, since the fuel cell 30 is inclined largely (for example, by 30 degrees) toward the vehicle body rear side, the reaction product water produced at the time of power generation and collecting on the lower side of the fuel cell 30 is permitted to flow favorably, whereby draining performance can be enhanced.

Figure 6:
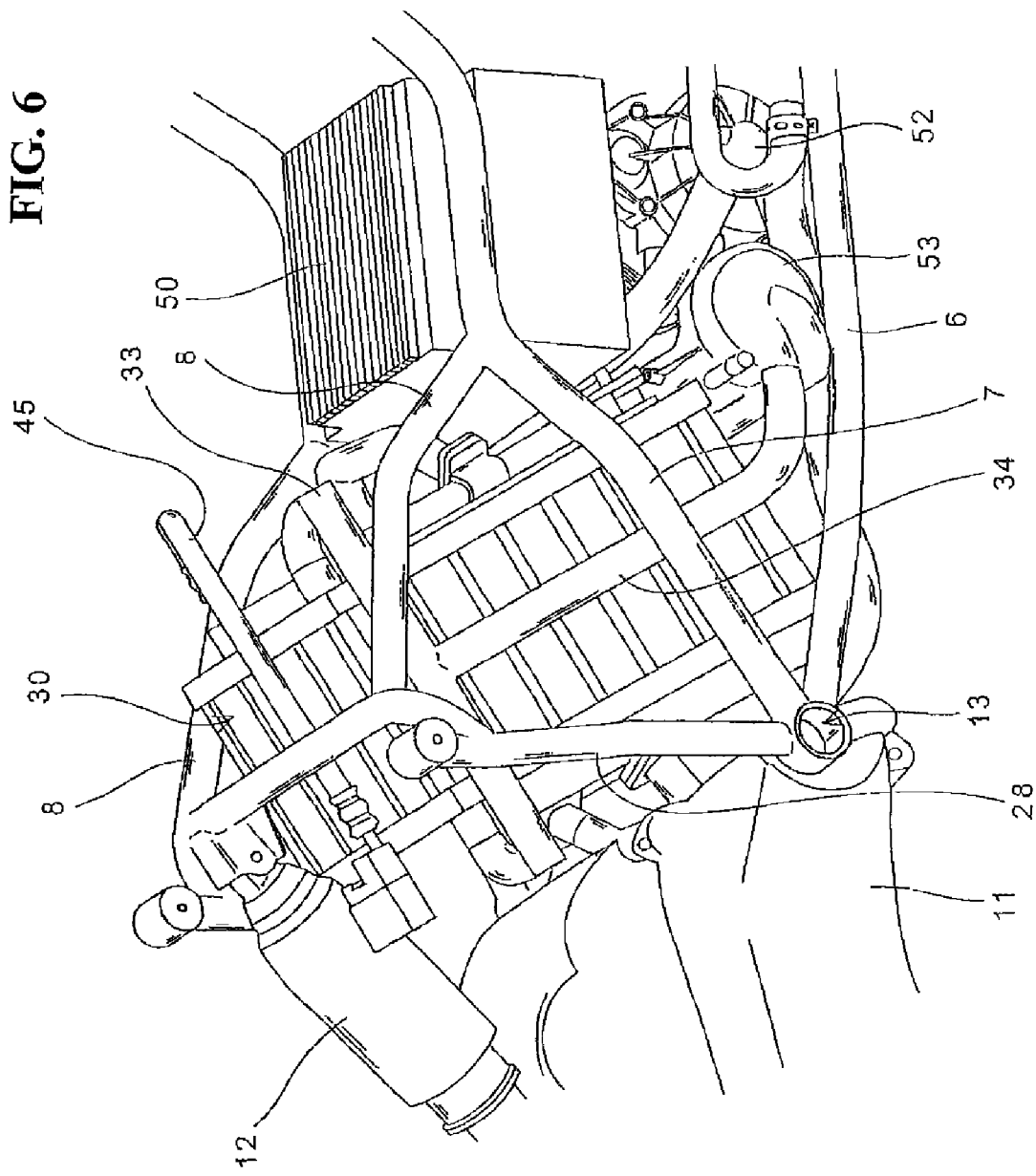
FIG. 6 is an enlarged perspective view showing the mounted condition of the fuel cell.

FIG. 6 is a perspective view showing the mounted condition of the fuel cell according to an embodiment of the present invention. The same symbols as used above denote the parts which are the same as or equivalent to those shown above. The air fed under pressure by the scroll type compressor 52 is passed through the humidifier 53, whereby it is converted into the reactant gas having a predetermined humidity. The reactant gas is led through the reactant gas pipe 34 to the vehicle body rear and upper side, and supplied into the suction-side manifold 33 mounted on the upper side of the fuel cell 30. Incidentally, the periphery of the fuel cell 30 is surrounded by the under frame 6, the guard pipe 7, the upper pipe 8, and the connecting pipe 28 so that even if an impact should be externally exerted, transmission of the impact to the fuel cell 30 would be restrained as assuredly as possible.

Figure 7:
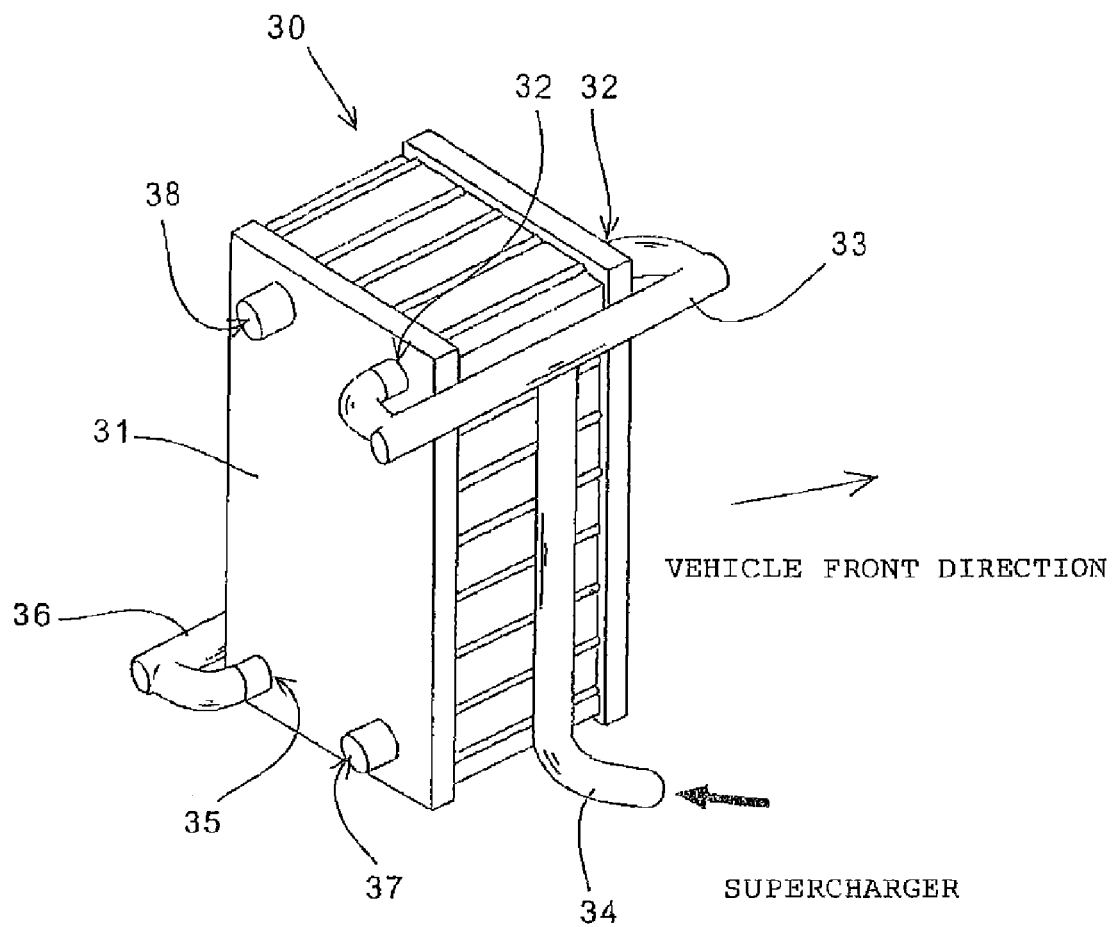
FIG. 7 is a perspective view of a fuel cell according to an embodiment of the present invention.
Figure 8:
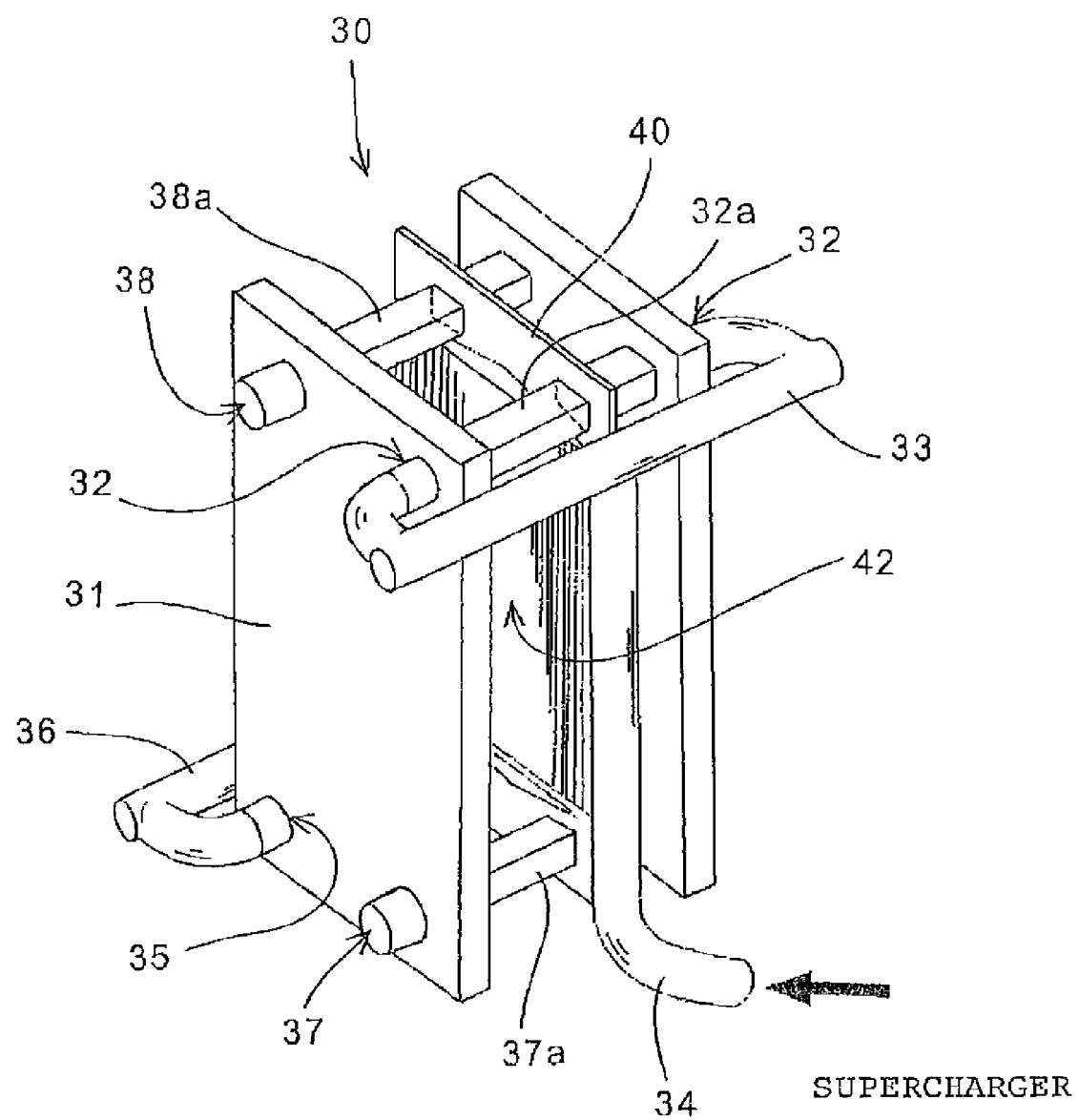
FIG. 8 is a perspective view showing the internal configuration of the fuel cell according to an embodiment of the present invention.
Figure 9:
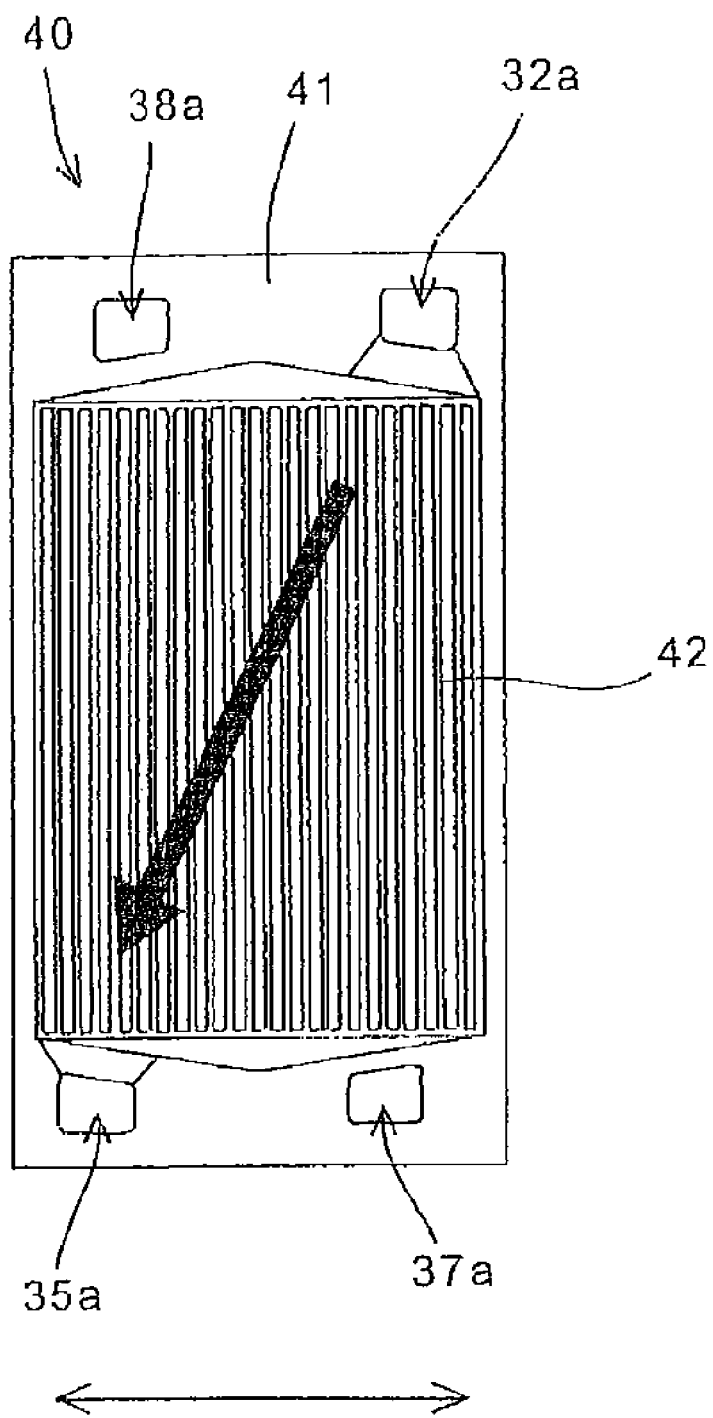
FIG. 9 is a front view of a cell incorporated in the fuel cell according to an embodiment of the present invention.

FIG. 7 is a perspective view of the fuel cell 30. In addition, FIG. 8 is a perspective view showing the internal configuration of the fuel cell, and FIG. 9 is a front view of the cell constituting the cell stack. The fuel cell 30 has a configuration in which the cell stack having a plurality of (for example, fifty) cells 40 stacked is contained in a box-like case 31, with the stacking direction set in the vehicle front-rear direction. The cell 40 having a sheet-like shape has a configuration in which a reaction part 42 including a separator, a fuel gas passage groove, an electrolyte membrane, and a reactant gas passage groove is disposed in the center, and a reactant gas suction hole 32a, a fuel gas suction hole 38a, an unreacted gas discharge hole 35a for discharging both the unreacted gas and the reaction product water, and a residual fuel gas outlet 37a are formed respectively at the four corners of a base part 41 for supporting the reaction part 42.

The respective holes are made to communicate respectively upon stacking of the cells 40, to form predetermined passages (a reactant gas suction passage, a fuel gas suction passage, an unreacted gas/reaction product water discharge passage, and a residual fuel gas outlet passage) extending along the stacking direction. Incidentally, the fuel cell 30 according to this embodiment is so configured that introduction of the fuel gas is conducted from the vehicle front side of the fuel gas suction port 38.

The fuel cell 30 is provided with two reactant gas suction ports 32 located to be on opposite sides of the case 31 in the stacking direction of the cells 40. The suction-side manifold 33 connects the two reactant gas suction ports 32 to each other on the outside of the fuel cell 30, so that the reactant gas can be supplied simultaneously through the two suction ports. This ensures that it becomes easy to increase the quantity of the reactant gas sucked in, and it becomes possible to enhance the reactant gas supplying efficiency. In addition, such a layout of the reactant gas suction ports 32 ensures that the reactant gas is introduced from both sides in the stacking direction of the cells 40, so that the reactant gas can be supplied evenly in the stacking direction of the cell stack, as compared for example with a system in which the reactant gas is introduced from either one of the opposite sides; besides, it becomes possible to enhance the efficiency of reaction with the reaction part 42.

Incidentally, the reactant gas pipe 34 can be connected to the suction-side manifold 33 at an arbitrary portion such as a central portion and an end portion, so that the layout or laying-around of the reactant gas pipe 34 is not limited although the two reactant gas suction ports 32 are provided; thus, the degree of freedom in designing the vehicle body and the like is enhanced.

In addition, in this embodiment, as for the unreacted gas discharge port 35, also, two such unreacted gas discharge ports 35 are provided so as to be located on opposite sides of the case 31 in the stacking direction of the cells 40. The discharge-side manifold 36 connects the two unreacted gas discharge ports 35 to each other on the outside of the fuel cell 30, so that the unreacted gas is discharged simultaneously through the two discharge ports, whereby it is made possible to reduce the resistance to discharge of the unreacted gas and it is made easy to increase the quantity of the reactant gas sucked in.

Figure 10:
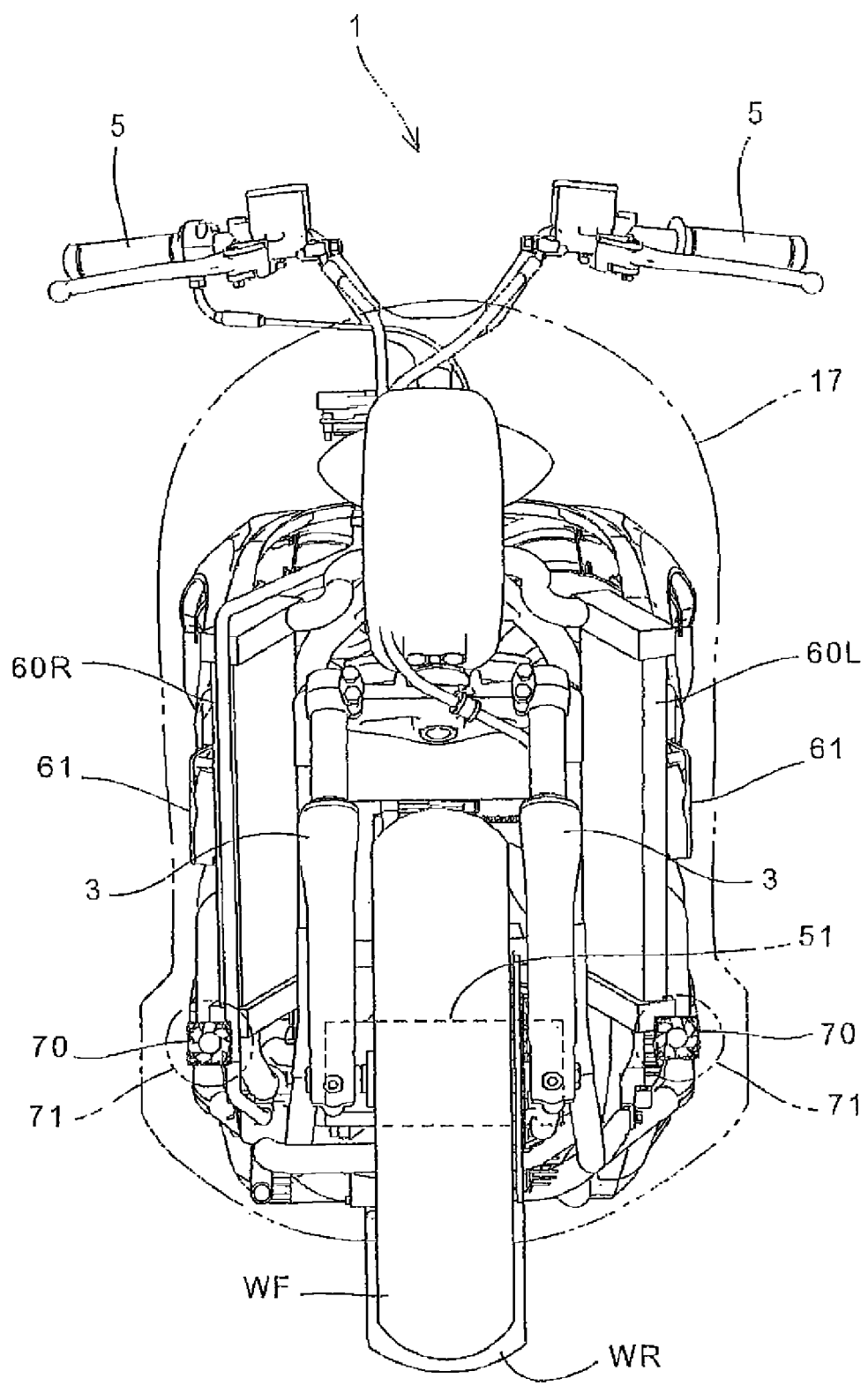
FIG. 10 is a front view of a saddle ride, fuel cell powered vehicle according to an embodiment of the present invention.

FIG. 10 is a front view of the fuel cell powered vehicle 1. The same symbols as used above denote the parts which are the same as or equivalent to those shown above. The left and right radiators 60L, 60R are mounted in the condition where their flat surface parts for disposing radiator cores are inclined toward the vehicle body center side, in such a manner as to prevent the cooling effect from being lowered due to blocking of the running airflow by the front wheel WR and the front fork 3. The secondary cell 51 is disposed between the left and right radiators 60L and 60R, on the vehicle body rear side of the front wheel WF. Of the vehicle body of the fuel cell powered vehicle 1, most part exclusive of the wheels is covered with a cowling 17 provided as an armor member.

The cowling 17 is formed from a resin sheet or the like, constitutes the appearance of the fuel cell powered vehicle 1, and has the function of preventing penetration of rains, dust or the like into the inside of the vehicle body and the function of straightening the running airflow. A left-right pair of openings 71 are formed on the vehicle body front side of the cowling 17, and motor-driven fans 70 for forcibly introducing the outside air into the inside of the cowling 17 are disposed substantially at the centers of the openings 71.

Figure 11:
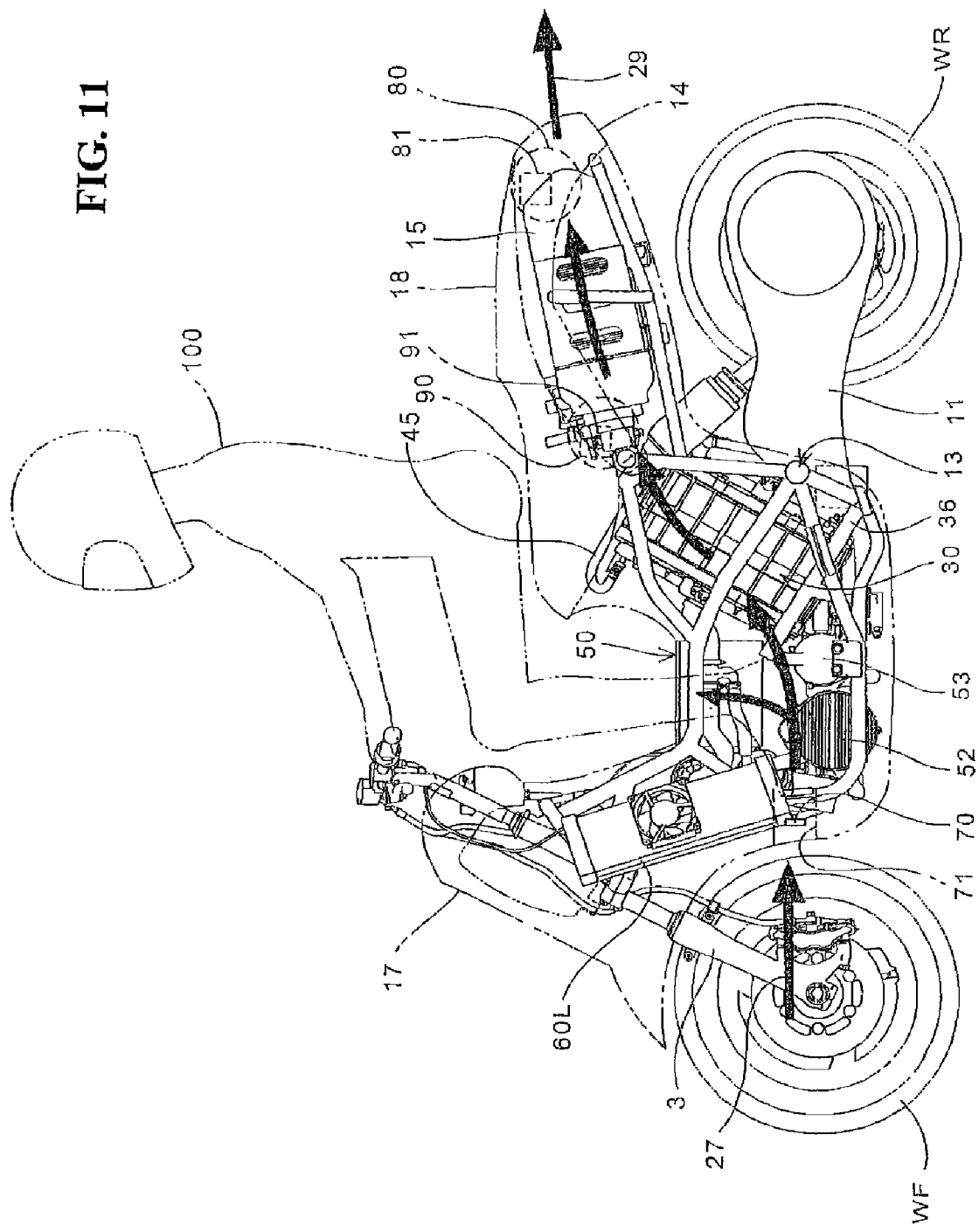
FIG. 11 is a left side view of a saddle ride, fuel cell powered vehicle according to an embodiment of the present invention.
Figure 12:
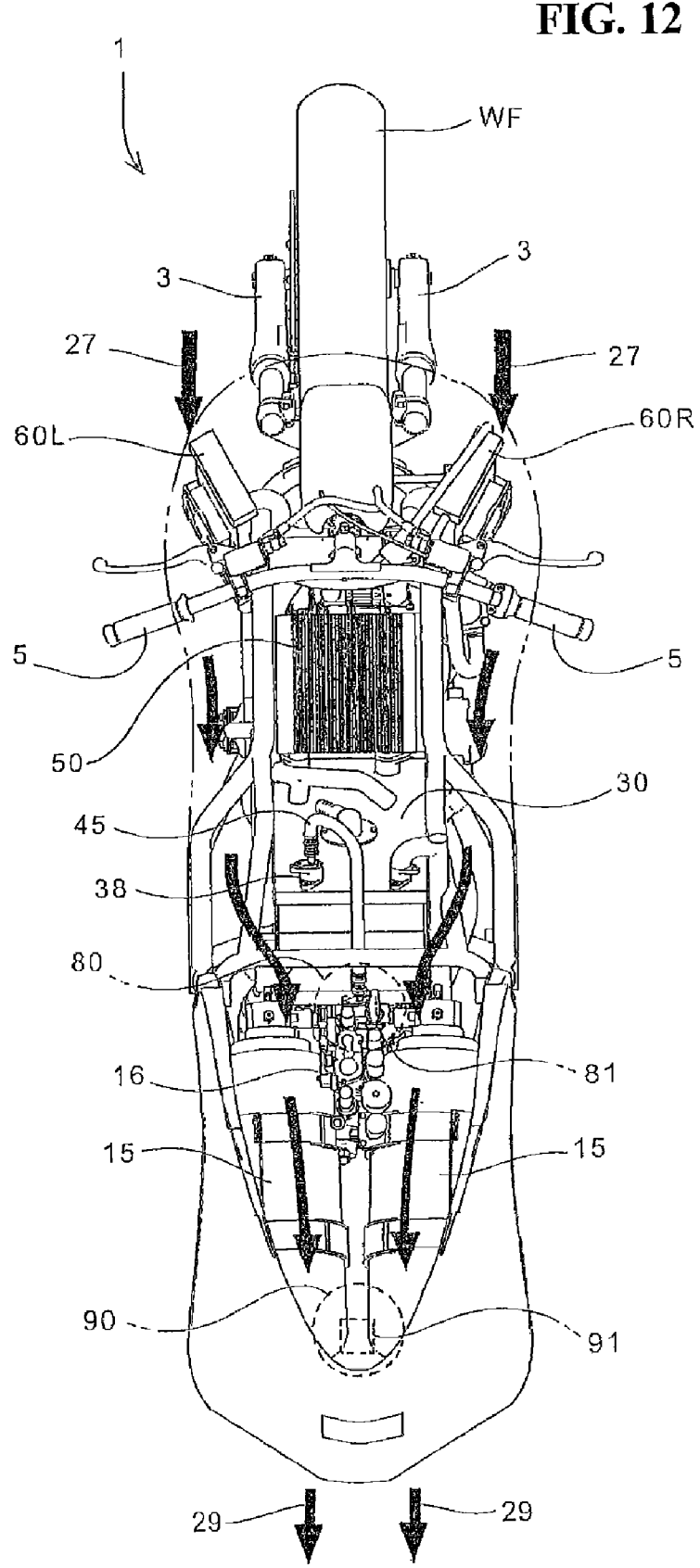
FIG. 12 is a top plan view of a fuel cell powered vehicle according to an embodiment of the present invention.

FIGS. 11 and 12 are a left side view and a top plan view of the fuel cell powered vehicle 1. The same symbols as used above denote the parts which are the same as or equivalent to those shown above. The cowling 17 of the fuel cell powered vehicle 1 is so configured that when the fuel cell powered vehicle 1 is running under the operation by the driver 100, the running airflow 27 is introduced through the openings 71 into the inside of the vehicle body, and, even when the fuel cell powered vehicle 1 is at stoppage, airflows similar to those during running as indicated by arrows in the figures are generated in the inside of the vehicle body by driving the motor-driven fans 70 through automatic control or manual operation.

The outside air introduced through the openings 71 is guided through duct structures (not shown) formed on the inside of the cowling 17, flows rearwards through the periphery of the hydrogen cylinder regulator 16 mounted on the vehicle body front side of the hydrogen cylinders 15 disposed at a lower part of a seat 18 and through the periphery of the hydrogen cylinders 15, is finally converged to a rear part of the rear cowl 14, and is discharged as a discharge gas 29. Incidentally, in this embodiment, the flows inside the vehicle body are utilized to cool the fuel cell 30 and the voltage converter unit 50 as well.

The fuel cell powered vehicle 1 according to this embodiment is fitted with two hydrogen sensors for detecting leakage of hydrogen from any part of the hydrogen cylinders 15 and each hydrogen passage. In a saddle ride, vehicle which normally does not have any compartment shielded from the outside air, if hydrogen leakage or the like should occur, it would be difficult for the leaked hydrogen to stagnate inside the vehicle body, so that the hydrogen leakage itself would be difficult to detect even with the hydrogen sensors installed.

In the fuel cell powered vehicle 1 in this embodiment, however, the airflows as above-mentioned are intentionally generated and the hydrogen sensors are disposed at predetermined positions, whereby hydrogen leakage can be detected efficiently. Thus, even if hydrogen leakage should occur, the leaked hydrogen is swiftly discharged to the exterior of the vehicle body, so that hydrogen can be prevented from stagnating in a location.

In this embodiment, a first hydrogen sensor 81 is mounted at a rear end upper part of the hydrogen cylinders 15, and a second hydrogen sensor 91 is mounted at a front end upper part of the hydrogen cylinders 15, i.e., between the fuel cell 30 and the hydrogen cylinders 15. Incidentally, since each hydrogen sensor is smaller (for example, a few centimeters cube) as compared with the hydrogen cylinder 15 and the like, only its layout position is indicated by a broken-line square in FIGS. 11 and 12. Incidentally, in view of flowing-up of hydrogen lighter than air, each hydrogen sensor is preferably mounted at the highest position in an allowable layout range.

The first hydrogen sensor 81 is disposed in a layout range 80 near rear end parts of the hydrogen cylinders 15, whereby the hydrogen detection performance is enhanced. This is because the airflows intentionally generated pass through the peripheries of all the hydrogen passages, to be converged on the vehicle body rear side. As a result, leakage of hydrogen can be assuredly detected by the first hydrogen sensor 81, irrespectively of the position of the hydrogen leakage.

In addition, a second hydrogen sensor 91 is disposed in a layout range 90 near front end parts of the hydrogen cylinders 15, whereby the hydrogen leakage detection performance is further enhanced. This configuration ensures that when hydrogen leakage occurs on the vehicle body front side, for example, at the fuel cell 30 or at the fuel gas pipe 45, the leakage can be swiftly detected. In addition, in the case where hydrogen leakage is detected by the first hydrogen sensor 81 but is not detected by the second hydrogen sensor 91, it is possible to infer that the position of the hydrogen leakage is on the vehicle body rear side relative to the second hydrogen sensor 91. Incidentally, when hydrogen leakage is detected, it is possible to inform the rider and the like of the leakage by an alarm or speaker attached to the fuel cell powered vehicle.

As has been described above, according to the fuel cell powered vehicle based on the present invention, the outside air is introduced through the openings 71 of the cowling 17 so as to form predetermined airflows inside the vehicle body, the airflows are converged to a rear part of the vehicle body and discharged, and the hydrogen sensors 81, 91 are mounted in the vicinity of the hydrogen cylinders 15 disposed at a rear part of the vehicle body. Therefore, hydrogen leakage can be detected securely, irrespectively of the location of the portion, relevant to the hydrogen leakage, of all the hydrogen passages.

Incidentally, the shapes of the fuel cell and the foot rest parts, the layout position of the pivot shaft, the inclination angle and the vertical position of the fuel cell, the ratio of the length of the swing arm to the wheel base, etc. are not limited to those in the above-described embodiments, and various modifications are possible.

Further, the reactant gas sucked into the cell stack flows in the direction from the reactant gas suction passage 32$a$ toward an unreacted gas discharge passage 35$a$, as shown in FIG. 9. Since the reactant gas supplied from the upper part side of the fuel cell is gradually consumed in the course of flowing downwards, if the quantity of the reactant gas supplied is deficient, the chance of chemical reaction may be reduced on the lower side in the reaction part 42, resulting in a lowered power generation efficiency. In the fuel cell powered vehicle according to the present invention, however, the two reactant gas suction ports of the fuel cell are provided so as to be located on both sides of the case in the stacking direction of the cells, so that the efficiency in supplying the reactant gas into the fuel cell can be enhanced, and a sufficient quantity of the reaction gas can be sucked in, without enlarging the supercharger. In addition, since the two unreacted gas discharge ports are provided to be located on both sides of the case in the stacking direction of the cells, it is possible to reduce the resistance to discharge of the unreacted gas from the fuel cell, and to cope with an increase in the quantity of the reactant gas sucked in.

Further, the shapes of the case, the cell and the cell stack of the fuel cell, the shapes and layout of the reactant gas suction ports, the unreacted gas discharge ports, the suction-side manifold, the discharge-side manifold and the like are not limited to those in the above-described embodiment, and various modifications are possible. For example, the suction-side manifold may be so formed as to be connected on the upper side of the fuel cell, and the reactant gas pipe may be connected to an end part or the like of the suction-side manifold.

Still further, the shape of the cowling, the shapes and layout positions of the openings, the structures and numbers of the duct paths and the hydrogen sensors inside the vehicle body, and the like are not limited to those in the above embodiments, and various modifications are possible. For example, the hydrogen sensor may be mounted only at a front end part of the hydrogen cylinders, or two or more hydrogen sensors may be mounted.

In addition, the form of the saddle ride, fuel cell powered vehicle is not limited to the motorcycle and may be a three- or four-wheel vehicle or the like, and various modifications may also be made as to the forms and layout of the component parts such as the fuel cell, the hydrogen reserving means, the supercharger, the humidifier, the voltage converter unit, the secondary cell, the radiator, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle ride, fuel cell powered vehicle which is driven to run by electric power supplied from a fuel cell, comprising:
   a pivot shaft for swingably supporting a swing arm on a vehicle body frame;
   a rear wheel mounted to said swing arm; and
   a seat for seating a driver,
   wherein said fuel cell is formed in a substantially rectangular parallelepiped shape, and is disposed on a lower side of said seat in a state of being inclined toward a vehicle body rear side from a state of having a longitudinal direction of the fuel cell in a vertical direction, and
   said pivot shaft is disposed in a range which is defined on a front side of a vertex located at a rear end (P) of a side-view rectangle of said fuel cell, and which is defined on the rear side of a vertex located at a lower end (Q) of the side-view rectangle of said fuel cell,
   wherein the fuel cell is supplied with a hydrogen-containing fuel gas and an oxygen-containing reactant gas and which discharges an unreacted gas and reaction product water,
   wherein said fuel cell includes a case for containing a plurality of cells stacked, a reactant gas suction port for supplying said reactant gas from an upper side of said case, and an unreacted gas discharge port for discharging said unreacted gas from a lower side of said case, and
   said two reactant gas suction ports are provided so as to be substantially perpendicular to the plane of said cells and to be located on opposite sides of said case.

2. The saddle ride, fuel cell powered vehicle according to claim 1, wherein said pivot shaft is disposed in a range which is defined on a lower side of the vertex located at the rear end (P) of the side-view rectangle of said fuel cell, and which is defined on an upper side of the vertex located at the lower end (Q) of the side-view rectangle of said fuel cell.

3. The saddle ride, fuel cell powered vehicle according to claim 1, further comprising:
   a steering handle for steering a front wheel; and
   foot rest parts for a driver provided between said steering handle and said seat,
   wherein said fuel cell is disposed on the vehicle body rear side of said foot rest parts so that a center of gravity (G1) of said fuel cell is located on the vehicle body front side relative to the center (G2) in the front-rear direction of a seating part on which to seat the driver at the time of riding.

4. The saddle ride, fuel cell powered vehicle according to claim 1, further comprising:
   a suction-side manifold for connecting said two reactant gas suction ports to each other on an outside of said case,
   a supercharger for forcibly supplying said reactant gas, and a reactant gas pipe for connection between said supercharger and said suction-side manifold.

5. The saddle ride, fuel cell powered vehicle according to claim 1, wherein two said unreacted gas discharge ports are provided so as to be substantially perpendicular to a plane of said cells and to be located on opposite sides of said case, and
   said vehicle further comprises a discharge-side manifold for connecting said two unreacted gas discharge ports to each other on the outside of said case.

6. The saddle ride, fuel cell powered vehicle according to claim 1, further comprising:
   hydrogen reserving means for reserving hydrogen gas to be supplied to said fuel cell; and
   a hydrogen sensor for detecting the hydrogen gas;
   wherein said saddle ride, fuel cell powered vehicle has an exterior equipment covering a vehicle body, and has a configuration in which outside air is introduced through an opening provided on a vehicle body front side of said exterior equipment into an inside of said vehicle body, is passed through the inside of said vehicle body inclusive of said fuel cell, is then converged to a rear part of said vehicle body and is discharged to an exterior,
   said hydrogen reserving means is disposed on a vehicle body rear side relative to said fuel cell, and
   said hydrogen sensor is disposed near a rear end part of said hydrogen reserving means.

7. The saddle ride, fuel cell powered vehicle according to claim 6, wherein said hydrogen reserving means is disposed with its longitudinal direction set along a vehicle body front-rear direction, and a second hydrogen sensor is disposed near a front end part of said hydrogen reserving means.

8. The saddle ride, fuel cell powered vehicle according to claim 6, wherein a motor-driven fan for forcibly introducing the outside air into the inside of said vehicle body is provided at said opening.

9. A saddle ride, fuel cell powered vehicle ride, fuel cell powered vehicle which is driven to run by electric power supplied from a fuel cell, comprising:
   a pivot shaft for swingably supporting a swing arm on a vehicle body frame;
   a rear wheel mounted to said swing arm; and
   a seat for seating a driver,
   wherein said fuel cell is formed in a substantially rectangular parallelepiped shape, and is disposed on a lower side of said seat in a state of being inclined toward a vehicle body rear side from a state of having a longitudinal direction of the fuel cell in a vertical direction, and
   said pivot shaft is disposed in a range which is defined on a front side of a vertex located at a rear end (P) of a side-view rectangle of said fuel cell, and which is defined on the rear side of a vertex located at a lower end (Q) of the side-view rectangle of said fuel cell, further comprising:
   hydrogen reserving means for reserving hydrogen gas to be supplied to said fuel cell,
   wherein said hydrogen reserving means is disposed on an upper side of the rear wheel, and
   a hydrogen gas supply port of said fuel cell is provided on an upper part side in the longitudinal direction of said fuel cell.

10. The saddle ride, fuel cell powered vehicle according to claim 9, wherein the fuel cell is supplied with a hydrogen-containing fuel gas and an oxygen-containing reactant gas and which discharges an unreacted gas and reaction product water,
   wherein said fuel cell includes a case for containing a plurality of cells stacked, a reactant gas suction port for supplying said reactant gas from an upper side of said case, and an unreacted gas discharge port for discharging said unreacted gas from a lower side of said case, and
   said two reactant gas suction ports are provided so as to be substantially perpendicular to the plane of said cells and to be located on opposite sides of said case.

11. The fuel cell powered vehicle according to claim 9, further comprising:
   hydrogen reserving means for reserving hydrogen gas to be supplied to said fuel cell; and
   a hydrogen sensor for detecting the hydrogen gas;
   wherein said saddle ride, fuel cell powered vehicle has an exterior equipment covering a vehicle body, and has a configuration in which outside air is introduced through an opening provided on a vehicle body front side of said exterior equipment into an inside of said vehicle body, is passed through the inside of said vehicle body inclusive of said fuel cell, is then converged to a rear part of said vehicle body and is discharged to an exterior,
   said hydrogen reserving means is disposed on a vehicle body rear side relative to said fuel cell, and
   said hydrogen sensor is disposed near a rear end part of said hydrogen reserving means.

12. A fuel cell powered vehicle which is driven to run by electric power supplied from a fuel cell, comprising:
   a pivot shaft for swingably supporting a swing arm on a vehicle body frame;
   a rear wheel mounted to said swing arm; and
   a seat for seating a driver,
   wherein said fuel cell is formed in a substantially rectangular parallelepiped shape, and is disposed below said seat in a state of being inclined toward a vehicle body rear side from a state of having a longitudinal direction of the fuel cell in a vertical direction, and
   said pivot shaft is disposed in a range which is defined in front of a vertex located at a rear end (P) of a side-view rectangle of said fuel cell, and which is defined to a rear of a vertex located at a lower end (Q) of the side-view rectangle of said fuel cell,
   the fuel cell powered vehicle further comprising:
   hydrogen reserving means for reserving hydrogen gas to be supplied to said fuel cell; and
   a hydrogen sensor for detecting the hydrogen gas;
   wherein said saddle ride, fuel cell powered vehicle has an exterior equipment covering a vehicle body, and has a configuration in which outside air is introduced through an opening provided on a vehicle body front side of said exterior equipment into an inside of said vehicle body, is passed through the inside of said vehicle body inclusive of said fuel cell, is then converged to a rear part of said vehicle body and is discharged to an exterior,
   said hydrogen reserving means is disposed on a vehicle body rear side relative to said fuel cell, and
   said hydrogen sensor is disposed near a rear end part of said hydrogen reserving means.

13. The fuel cell powered vehicle according to claim 12, wherein said pivot shaft is disposed in a range which is defined below the vertex located at the rear end (P) of the side-view rectangle of said fuel cell, and which is defined higher than the vertex located at the lower end (Q) of the side-view rectangle of said fuel cell.

14. The fuel cell powered vehicle according to claim 12, further comprising:
   a steering handle for steering a front wheel; and
   foot rest parts for a driver provided between said steering handle and said seat,
   wherein said fuel cell is disposed on the vehicle body rear side of said foot rest parts so that a center of gravity (G1) of said fuel cell is located on the vehicle body front side relative to the center (G2) in the front-rear direction of a seating part on which to seat the driver at the time of riding.

15. The fuel cell powered vehicle according to claim 12, further comprising:
   hydrogen reserving means for reserving hydrogen gas to be supplied to said fuel cell,
   wherein said hydrogen reserving means is disposed on an upper side of the rear wheel, and
   a hydrogen gas supply port of said fuel cell is provided on an upper part side in the longitudinal direction of said fuel cell.

16. The fuel cell powered vehicle according to claim 12, wherein the fuel cell is supplied with a hydrogen-containing fuel gas and an oxygen-containing reactant gas and which discharges an unreacted gas and reaction product water,
   wherein said fuel cell includes a case for containing a plurality of cells stacked, a reactant gas suction port for supplying said reactant gas from an upper side of said case, and an unreacted gas discharge port for discharging said unreacted gas from a lower side of said case, and
   said two reactant gas suction ports are provided so as to be substantially perpendicular to the plane of said cells and to be located on opposite sides of said case.

17. The fuel cell powered vehicle according to claim 16, further comprising:
   a suction-side manifold for connecting said two reactant gas suction ports to each other on an outside of said case, a supercharger for forcibly supplying said reactant gas, and a reactant gas pipe for connection between said supercharger and said suction-side manifold.

18. The fuel cell powered vehicle according to claim 16, wherein two said unreacted gas discharge ports are provided so as to be substantially perpendicular to a plane of said cells and to be located on opposite sides of said case, and
   said vehicle further comprises a discharge-side manifold for connecting said two unreacted gas discharge ports to each other on the outside of said case.

19. The fuel cell powered vehicle according to claim 12, wherein said hydrogen reserving means is disposed with its longitudinal direction set along a vehicle body front-rear direction, and a second hydrogen sensor is disposed near a front end part of said hydrogen reserving means.

20. The fuel cell powered vehicle according to claim 12, wherein a motor-driven fan for forcibly introducing the outside air into the inside of said vehicle body is provided at said opening.

* * * * *